US011112804B2

(12) United States Patent
Kobayashi et al.

(10) Patent No.: US 11,112,804 B2
(45) Date of Patent: Sep. 7, 2021

(54) AUTONOMOUS DRIVING CONTROL APPARATUS AND PROGRAM PRODUCT

(71) Applicant: DENSO CORPORATION, Kariya (JP)

(72) Inventors: Kazuhiko Kobayashi, Kariya (JP); Kazuyoshi Akiba, Kariya (JP); Toshikazu Murao, Kariya (JP)

(73) Assignee: DENSO CORPORATION, Kariya (JP)

( * ) Notice: Subject to any disclaimer, the term of this patent is extended or adjusted under 35 U.S.C. 154(b) by 38 days.

(21) Appl. No.: 16/426,308

(22) Filed: May 30, 2019

(65) Prior Publication Data
US 2019/0369635 A1 Dec. 5, 2019

(30) Foreign Application Priority Data

May 31, 2018 (JP) .............................. JP2018-104690

(51) Int. Cl.
*G05D 1/02* (2020.01)
*G05D 1/00* (2006.01)
*B60W 50/02* (2012.01)
*B60W 50/023* (2012.01)
*B60W 50/029* (2012.01)

(52) U.S. Cl.
CPC ......... *G05D 1/0246* (2013.01); *B60W 50/023* (2013.01); *B60W 50/0205* (2013.01); *G05D 1/0061* (2013.01); *B60W 2050/0215* (2013.01); *B60W 2050/0295* (2013.01); *G05D 2201/0213* (2013.01)

(58) Field of Classification Search
CPC . B60W 2050/0215; B60W 2050/0295; B60W 2420/42; B60W 50/0205; B60W 50/023; B60W 50/029; B60W 60/00186; B60W 60/0059; G05D 1/0061; G05D 1/0246; G05D 2201/0213
See application file for complete search history.

(56) References Cited

U.S. PATENT DOCUMENTS 6,574,754 B1 * 6/2003 Smith .................... G11B 27/36
706/26
8,884,522 B2 * 11/2014 Imaeda .............. G06K 9/00825
315/82
9,566,986 B1 * 2/2017 Gordon ................. B60W 50/12
(Continued)

FOREIGN PATENT DOCUMENTS

JP 2012166615 A 9/2012
JP 2017157067 A 9/2017

*Primary Examiner* — Babar Sarwar
(74) *Attorney, Agent, or Firm* — Maschoff Brennan

(57) ABSTRACT

In an autonomous driving control apparatus, a drive control unit determines, based on first and second images respectively captured by first and second cameras and an autonomous driving condition, a value of at least one controlled variable for autonomous driving of a vehicle, and outputs, to a vehicle control unit, the value of the at least one controlled variable to thereby cause the vehicle control unit to carry out a task of autonomously driving the vehicle. A camera monitor unit determines whether at least one of the first and second cameras has malfunctioned. The camera monitor unit limits, based on the at least one of the first and second directional regions corresponding to the at least of the first and second cameras, the autonomous driving condition when determining that the at least one of the first and second cameras has malfunctioned.

7 Claims, 5 Drawing Sheets

(56) References Cited

U.S. PATENT DOCUMENTS

| | | | | |
|---|---|---|---|---|
| 10,235,772 | B2* | 3/2019 | Wang | G06T 7/80 |
| 10,242,665 | B1* | 3/2019 | Abeloe | G05D 1/0221 |
| 10,398,368 | B2* | 9/2019 | Yoshida | A61B 5/18 |
| 10,620,631 | B1* | 4/2020 | Abeloe | G05D 1/0088 |
| 10,732,628 | B2* | 8/2020 | Sakaguchi | G01S 15/86 |
| 10,795,364 | B1* | 10/2020 | Abeloe | G06N 3/006 |
| 10,802,488 | B1* | 10/2020 | Abeloe | G10L 15/22 |
| 10,802,489 | B1* | 10/2020 | Abeloe | G05D 1/0221 |
| 2008/0294309 | A1* | 11/2008 | Kaprielian | G05D 1/024 701/27 |
| 2012/0207461 | A1* | 8/2012 | Okuda | B60R 11/04 396/419 |
| 2014/0148988 | A1* | 5/2014 | Lathrop | B60W 50/14 701/23 |
| 2015/0042491 | A1* | 2/2015 | Burnison | B60Q 1/52 340/902 |
| 2016/0041553 | A1* | 2/2016 | Sato | B60W 30/143 701/23 |
| 2017/0021837 | A1* | 1/2017 | Ebina | B60K 28/06 |
| 2017/0232974 | A1* | 8/2017 | Nishida | B60W 50/082 701/24 |
| 2017/0303842 | A1* | 10/2017 | Yoshida | B60W 50/0097 |
| 2017/0357361 | A1* | 12/2017 | Hong | B60W 10/18 |
| 2018/0007263 | A1* | 1/2018 | Vandrotti | G06K 9/4609 |
| 2018/0088577 | A1* | 3/2018 | Kim | H04M 1/72463 |
| 2018/0105184 | A1* | 4/2018 | Urano | G05D 1/0061 |
| 2018/0194364 | A1* | 7/2018 | Asakura | B60W 50/0205 |
| 2018/0196442 | A1* | 7/2018 | Wang | G05D 1/0246 |
| 2019/0016340 | A1* | 1/2019 | Bae | G08G 1/0112 |
| 2019/0041850 | A1* | 2/2019 | Chase | G08G 1/09675 |
| 2019/0061775 | A1* | 2/2019 | Emura | G05D 1/0061 |
| 2019/0204826 | A1* | 7/2019 | Tsai | B60W 60/0053 |
| 2019/0227547 | A1* | 7/2019 | Sugahara | B60K 28/06 |
| 2019/0256054 | A1* | 8/2019 | Turner | G06K 9/00805 |
| 2019/0315344 | A1* | 10/2019 | Guibert De Bruet | B60W 10/20 |
| 2020/0043254 | A1* | 2/2020 | Hase | G08G 1/0112 |
| 2020/0064483 | A1* | 2/2020 | Li | G01S 17/87 |
| 2020/0070847 | A1* | 3/2020 | Horiguchi | B60W 30/0956 |
| 2020/0079394 | A1* | 3/2020 | Masuda | B60R 21/00 |
| 2020/0226794 | A1* | 7/2020 | Sugio | H04N 13/275 |
| 2020/0278685 | A1* | 9/2020 | Jang | G08G 1/16 |
| 2020/0290641 | A1* | 9/2020 | Kawakami | B60W 50/14 |
| 2020/0317213 | A1* | 10/2020 | Oba | B60W 50/0205 |

* cited by examiner

AUTONOMOUS DRIVING CONTROL APPARATUS AND PROGRAM PRODUCT

CROSS REFERENCE TO RELATED APPLICATIONS

This application is based on and claims the benefit of priority from Japanese Patent Application 2018-104690 filed on May 31, 2018, the disclosure of which is incorporated in its entirety herein by reference.

TECHNICAL FIELD

The present disclosure relates to autonomous driving control apparatuses and program products. More particularly, the present disclosure relates to these apparatuses and programs, each of which is capable of autonomously driving a vehicle based on images of a forward region of the vehicle in its travelling direction.

BACKGROUND

A known autonomous driving control apparatus includes an autonomous driving system installed in a host vehicle for autonomously driving the host vehicle when the host vehicle is set to an autonomous driving mode. In contrast, the driver's manual driving of the host vehicle is carried out when the host vehicle is set to a manual driving mode.

SUMMARY

According to a first exemplary aspect of the present disclosure, there is provided an autonomous driving control apparatus installable in a vehicle. The autonomous driving control apparatus includes a camera monitor unit configured to determine whether at least one of first and second cameras has malfunctioned, and limit, when determining that one of the first and second cameras has malfunctioned, an autonomous driving condition based on one of first and second directional regions corresponding to one of the first and second cameras having malfunctioned. A drive control unit of the apparatus is configured to determine the value of at least one controlled variable in accordance with the limited autonomous driving condition to thereby cause the vehicle control unit to continuously carry out a task of autonomously driving the vehicle in accordance with the determined value of the at least one controlled variable.

According to a second exemplary aspect of the present disclosure, there is provided a program product for a vehicle. The computer program product includes a non-transitory computer-readable storage medium, and a set of computer program instructions stored in the computer-readable storage medium. The instructions cause a computer to carry out 1. A first step of determining whether one of first and second cameras has malfunctioned
2. A second step of limiting, when it is determined one of the first and second cameras has malfunctioned, an autonomous driving condition based on one of first and second directional regions corresponding to one of the first and second cameras has malfunctioned

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Inventor's Viewpoint

Figure 1:
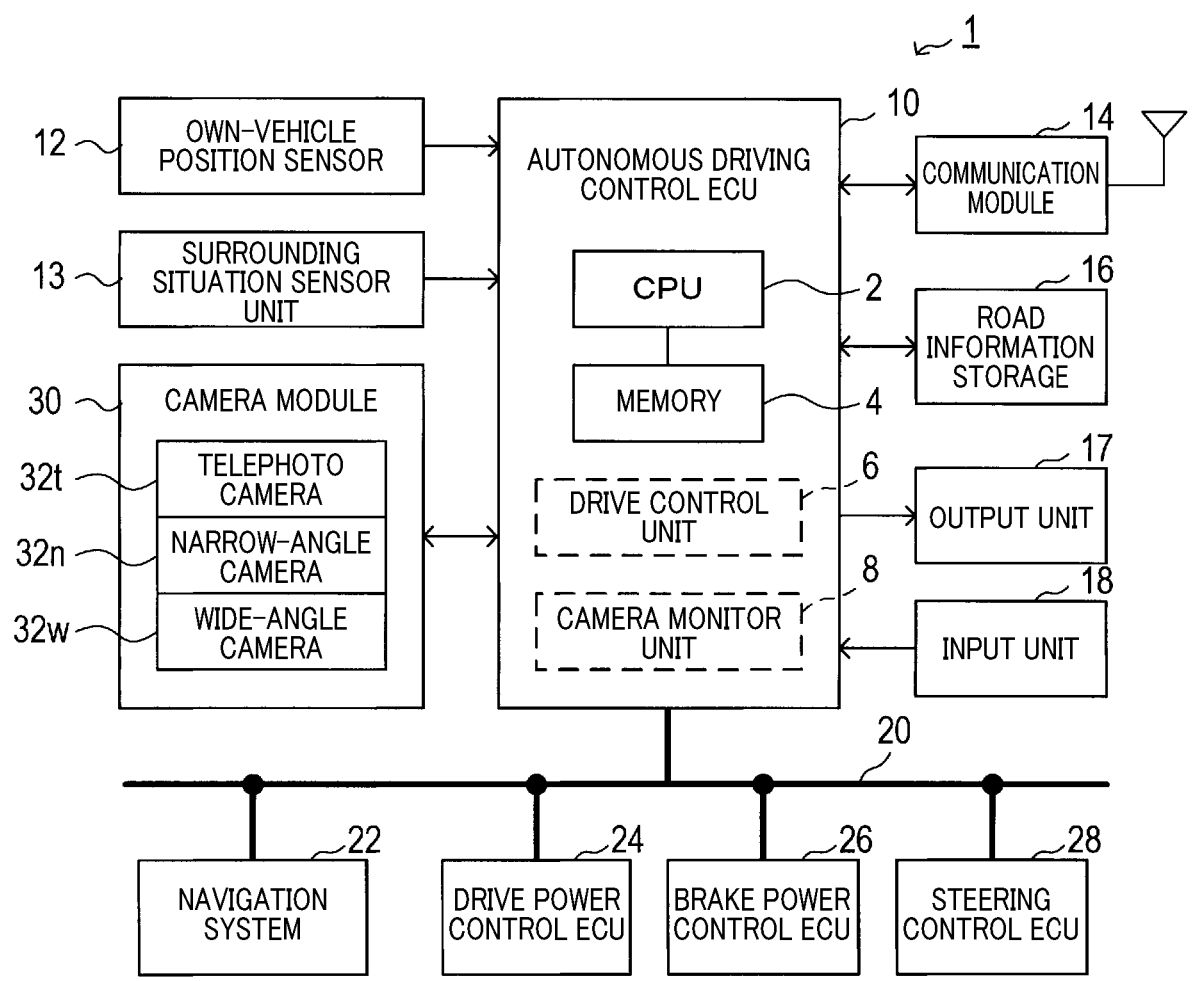
FIG. 1 is a block diagram schematically illustrating an example of the overall structure of an autonomous driving control system according to an exemplary embodiment of the present disclosure.

A known autonomous driving control apparatus, which is for example disclosed in Japanese Patent Application Publication No. 2017-157067, includes an autonomous driving system installed in a host vehicle for autonomously driving the host vehicle when the host vehicle is set to an autonomous driving mode. In contrast, the driver's manual driving of the host vehicle is carried out when the host vehicle is set to a manual driving mode.

The published autonomous driving system installed in a host vehicle includes an autonomous driving system, which is comprised of an individual computer and is capable of controlling autonomous driving of the host vehicle in level 3 of the previously defined six autonomous driving levels.

The published autonomous driving control apparatus also includes a preventive safety system, which is comprised of an individual computer and is capable of controlling autonomous driving of the host vehicle in level 2 of the previously defined levels. The autonomous driving system controls all of the acceleration, steering, and braking of the host vehicle in level 3 of the six autonomous driving levels. The predictive safety system controls some of the acceleration, steering, and braking of the host vehicle in level 2 of the six autonomous driving levels.

Specifically, the autonomous driving control apparatus disclosed in the published patent document is configured such that the predictive safety system performs autonomous driving of the host vehicle in the level 2 of the six autonomous driving levels in response to an autonomous request. Thereafter, the autonomous driving control apparatus is configured such that the autonomous driving system performs autonomous driving of the host vehicle in the level 3 of the six autonomous driving levels when it is determined that a predetermined level 3 authorization condition is satisfied.

Each of the predictive safety system and autonomous driving system is configured to perform an emergency limp-home mode to pull over the host vehicle to a safe place upon it being determined that there is a malfunction in the other of the predictive safety system and autonomous driving system. While performing the emergency limp-home mode, each of the predictive safety system and autonomous driving system is configured to shift autonomous driving of the host vehicle to level 1 of the six autonomous driving levels in response to a driver's intervention to the driving of the host vehicle. Note that level 1 of the six autonomous driving levels represents a driver assistance mode for assisting the driver's acceleration, steering, and braking of the host vehicle.

The published autonomous driving control apparatus described in the published patent document is configured as a redundant vehicle control system, i.e. a duplicated vehicle control system, comprised of the individual computer of the autonomous driving system, and the individual computer of the predictive safety system. This redundant vehicle control system of the autonomous driving control apparatus enables autonomous driving of the host vehicle to be continuously carried out even if one of the he autonomous driving system and the predictive safety system has malfunctioned. Additionally, the published autonomous driving control apparatus comprised of the level 3 autonomous driving system and the level 2 predictive safety system results in a lower cost than autonomous driving control apparatuses each with duplicated level 3 autonomous systems.

A malfunction in one of the predictive safety system and autonomous driving system of the published autonomous driving control apparatus causes the other of the predictive safety system and autonomous driving system to perform the emergency limp-home mode to pull the host vehicle over to a safe place. This may complicate continuous execution of autonomous driving of the host vehicle.

Let the published autonomous driving control apparatus be configured to determine a travelling route of the host vehicle using images captured by an in-vehicle camera, and to perform autonomous steering of the host vehicle. In this case, a malfunction in the in-vehicle camera may make it difficult for the published autonomous driving control apparatus to pull over the host vehicle to a safe place even if the apparatus includes the duplicated vehicle control system.

Such a malfunction of the in-vehicle camera may therefore require the operation mode of the host vehicle to be switched from the autonomous driving mode to the manual driving mode. This may make it difficult for the driver to perform autonomous driving of the host vehicle using the published autonomous driving control apparatus, resulting in the published autonomous driving control apparatus having a lower usability.

In view of the above circumstances, a first aspect of the present disclosure seeks to provide autonomous driving control apparatuses, each of which is configured to perform autonomous driving of a host vehicle using an image captured by an in-vehicle camera, and is capable of continuously performing autonomous driving of the host vehicle even if there is a malfunction in the in-vehicle camera.

A second aspect of the present disclosure seeks to provide program products, each of which causes a processor to perform autonomous driving of a host vehicle using an image captured by an in-vehicle camera, and is capable of causing a processor to continuously perform autonomous driving of the host vehicle even if there is a malfunction in the in-vehicle camera.

According to a first exemplary aspect of the present disclosure, there is provided an autonomous driving control apparatus installable in a vehicle that includes: at least first and second cameras configured to respectively capture at least first and second images of at least first and second directional regions that are at least partly different from each other around the vehicle; and a vehicle control unit configured to control a travelling state of the vehicle. The autonomous driving control apparatus includes a drive control unit configured to determine, based on the first and second images and an autonomous driving condition, a value of at least one controlled variable for autonomous driving of the vehicle, and output, to the vehicle control unit, the value of the at least one controlled variable to thereby cause the vehicle control unit to carry out a task of autonomously driving the vehicle. The autonomous driving control apparatus includes a camera monitor unit configured to determine whether at least one of the first and second cameras has malfunctioned, and limit, when determining that one of the first and second cameras has malfunctioned, the autonomous driving condition based on one of the first and second directional regions corresponding to one of the first and second cameras having malfunctioned. The drive control unit is configured to determine the value of the at least one controlled variable in accordance with the limited autonomous driving condition to thereby cause the vehicle control unit to continuously carry out the task of autonomously driving the vehicle in accordance with the determined value of the at least one controlled variable.

According to a second exemplary aspect of the present disclosure, there is provided a program product for a vehicle that includes at least first and second cameras configured to respectively capture at least first and second images of at least first and second directional regions that are at least partly different from each other from the vehicle. The vehicle includes a vehicle control unit configured to control a travelling state of the vehicle, and a drive control unit. The drive control unit is configured to determine, based on the first and second images and an autonomous driving condition, a value of at least one controlled variable for autonomous driving of the vehicle, and output, to the vehicle control unit, the value of the at least one controlled variable to thereby cause the vehicle control unit to carry out a task of autonomously driving the vehicle. The computer program product includes a non-transitory computer-readable storage medium, and a set of computer program instructions stored in the computer-readable storage medium. The instructions cause a computer to carry out 1. A first step of determining whether one of the first and second cameras has malfunctioned
2. A second step of limiting, when it is determined one of the first and second cameras has malfunctioned, the autonomous driving condition based on one of the first and second directional regions corresponding to one of the first and second cameras has malfunctioned This configuration of each of the first and second exemplary aspects therefore enables autonomous driving of the vehicle to be continuously carried out based on the limited autonomous driving conditions even if one of the first and second cameras has malfunctioned. This therefore eliminates the need to discontinue, i.e. cancel, the autonomous driving of the vehicle, thus providing the autonomous driving apparatus being more convenient for drives of the vehicle Embodiment The following describes an exemplary embodiment of the present disclosure with reference to the accompanying drawings.

The following describes an example of the configuration of an autonomous driving system 1 according to the exemplary embodiment of the present disclosure with reference to FIG. 1.

Referring to FIG. 1, the autonomous driving system 1 is for example installed in an autonomous vehicle V, such as a passenger vehicle, and configured to autonomously drive the autonomous vehicle V, which will be referred to simply as a vehicle V.

The autonomous driving system 1 for example includes an autonomous driving control electronic control unit (ECU) 10 as its main component. In addition to the autonomous driving control ECU 10, which is simply referred to as an ECU 10, the autonomous driving system 1 includes, for example, an own-vehicle position sensor unit 12, a surrounding situation sensor unit 13, a communication module 14, a road information storage 16, an output unit 17, an input unit 18, and a camera module 30. These components 12 to 18 and 30 are communicably connectable to the ECU 10.

In the vehicle V, a navigation system 22, a drive power control ECU 24, a brake power control ECU 26, and a steering control ECU 28 are installed. These components 20 to 28 are communicably connectable to each other via an in-vehicle network 20 installed in the vehicle V.

The own-vehicle position sensor unit 12 is capable of measuring the current position of the vehicle V. For example, the own-vehicle position sensor unit 12 includes a global positioning system (GPS) receiver and a gyro sensor. The GPS receiver is configured to receive, via a GPS antenna, GPS signals, which are sent from GPS satellites, to thereby calculate for example the latitude and longitude of the position of the GPS antenna of the vehicle V based on the received GPS signals as position data of the GPS antenna.

The gyro sensor is configured to measure a value of the angular velocity around at least one of predetermined pitch axis, roll axis, and yaw axis of the vehicle V. These pitch, roll, and yaw axes pass through the center of gravity of the vehicle V. The pitch axis represents a horizontal axis parallel to the width direction of the vehicle V, the yaw axis represents a vertical axis parallel to the height direction of the vehicle V, and the roll axis represents a longitudinal axis parallel to the longitudinal direction of the vehicle V.

The own-vehicle position sensor unit 12 is configured to calculate, as a current position of the vehicle V, a current position of the center of the gravity of the vehicle V based on a predetermined positional relationship between the GPS antenna and the center of gravity of the vehicle V, the measured position data of the GPS antenna, and the measured value of the angular velocity around at least one of the pitch, roll, and yaw axes of the vehicle V. Then, the own-vehicle position sensor unit 12 is configured to send a measurement signal indicative of the current position of the vehicle V to the ECU 10.

The surrounding situation sensor unit 13 is capable of measuring a current surrounding situation around the vehicle V; the current surrounding situation around the vehicle V can be used by the ECU 10.

For example, the surrounding situation sensor unit 13 includes for example at least one of a laser radar sensor, a millimeter-wave sensor, a ultrasonic-wave sensor. The surrounding situation sensor unit 13 is configured to (1) Transmit, to a predetermined surrounding region around the vehicle V, probing waves (2) Receive reflection waves, i.e. echoes, generated based on reflection of the transmitted probing waves by objects located around the vehicle V (3) Detect, based on the received reflection waves, the existence, location, size, and/or distance of each of the objects For example, the objects include 1. One or more surrounding travelling vehicles travelling around the vehicle V 2. One or more surrounding obstacles that is located around the vehicle V and obstruct travelling of the vehicle V The one or more surrounding travelling vehicles include 1. A preceding vehicle travelling on the same lane of the vehicle V and located in front of the vehicle V 2. A preceding vehicle travelling on an adjacent lane of the lane of the vehicle V and located at the front side of the vehicle V 3. One or more on coming vehicles 4. One or more incoming vehicles The one or more surrounding obstacles include 1. One or more stopped vehicles 2. One or more fallen objects 3. One or more stopped objects 4. One or more pedestrians The surrounding situation sensor unit 13 is capable of sending, to the ECU 10, a measurement signal indicative of the current surrounding situation.

The communication module 14 enables the ECU 10 to communicate, by radio, with traffic servers established outside the vehicle V to thereby obtain (1) Traffic condition information (2) Weather condition information The weather condition information represents the weather condition, such as a bright condition, a rain condition, a cloud condition, a snow condition, a fog condition, or a sandstorm condition around the vehicle V, which can be collected by at least one of the traffic servers.

The traffic condition information includes various types of traffic information about each road on which the vehicle V can travel. For example, the traffic condition information can include a speed limit of each travelable road, information about whether passing is permitted for each travelable road, information about whether there are traffic regulations for each travelable road.

The road information storage 16, which is for example comprised of a rewritable storage medium, such as a flash ROM, rewritably stores road information about one or more roads on which the vehicle V is scheduled to travel; the road information about each of the scheduled roads includes 1. The type of the road whether the road is an urban road or an expressway, how many lanes the road has, and whether there are one or more oncoming lanes in the road 2. The width of each lane in the road 3. The center line of each lane in the road 4. The curvature of the road when the road is a curved road 5. The positions of one or more stop lines marked on the road 6. The positions of one or more traffic lights when the one or more traffic lights are provided on the road Note that the navigation system 22 described later is for example configured to provide the road information to the ECU 10.

The output unit 17 includes, for example, an image display and a sound speaker, and is capable of visibly and/or audibly outputting, to a driver of the vehicle V, various messages using the image display and/or the sound speaker.

The input unit 18 includes, for example, operation switches and/or operation levers, and enables a driver of the vehicle V to input, to the ECU 10, various instructions for autonomous driving of the vehicle V using the operation switches and/or operation levers.

The camera module 30 is capable of capturing images from the surrounding region around the vehicle V.

For example, the camera module 30 is comprised of three cameras with respective different angular fields of view, i.e. a wide-angle camera 32w, a narrow-angle camera 32n whose angular field of view narrower than that of the wide-angle camera 32w, and a telephoto camera 32t whose angular field of view is narrower than that of the narrow-angle camera 32n.

Note that the angular field of view of each of the lenses 33w, 33n, and 33t is at least one of 1. A diagonal angular field of view corresponding to a diagonal direction of a captured image of the corresponding camera, i.e. a diagonal line of the light-receiving surface of the corresponding imaging device 2. A horizontal angular field of view corresponding to a horizontal direction of a captured image of the corresponding camera, i.e. a horizontal direction of the light-receiving surface of the corresponding imaging device 3. A vertical angular field of view corresponding to a vertical direction of a captured image of the corresponding camera, i.e. a vertical direction of the light-receiving surface of the corresponding imaging device.

This exemplary embodiment uses the horizontal angular field of view of each lens 33w, 33n, 33t as the angular field of view of the corresponding lens.

Images, such as two-dimensional frame images, captured by the respective cameras 32w, 32n, and 32t are used for recognizing lane markers on a scheduled road on which the vehicle V is scheduled to travel, and for recognizing objects existing in the surrounding region around the vehicle V. The structure of the camera module 30 according to the exemplary embodiment will be described in detail later.

The navigation system 22 is configured to store various road information items and map information items about many roads that the vehicle V is travelable.

Specifically, the navigation system 22 is configured to continuously display a road map on the image display of the output unit 17 around the current position of the vehicle V, and display, on the road map, a selected route from the current position of the vehicle V to a destination in response to when a driver of the vehicle V inputs the destination using the input unit 17. Then, the navigation system 22 is configured to obtain the road information about one or more roads included in the selected route, and provide the road information about the one or more scheduled roads to the ECU 10. The navigation system 22 is also configured to provide, to a driver of the vehicle V, a visible and audible guide for enabling the vehicle V to travel along the selected route using the image display and the sound speaker.

The drive power control ECU 24 is configured to control at least one drive actuator, such as an internal combustion engine and/or a motor; the at least one drive actuator outputs controlled drive power to thereby rotatably drive driving wheels of the vehicle V.

Specifically, the drive power control ECU 24 is configured to control the at least one drive actuator to thereby cause the at least one drive actuator to generate drive power based on an operated amount of an accelerator pedal operated by a driver of the vehicle V when the operation mode of the vehicle V is set to a manual driving mode, thus rotatably driving the driving wheels based on the generated drive power.

The drive power control ECU 24 is also configured to receive requested drive power from the ECU 10 when the operation mode of the vehicle V is set to an autonomous driving mode, and control the at least one drive actuator to thereby cause the at least one drive actuator to generate drive power that satisfies the requested drive power, thus rotatably driving the driving wheels based on the generated drive power.

Note that the operation mode of the vehicle V can be changed by, for example, the ECU 10 in accordance with an instruction sent by a driver's operation of the input unit 17.

The brake power control ECU 26 is configured to control at least one brake actuator; the at least one brake actuator outputs controlled brake power to thereby brake the vehicle V.

Specifically, the brake power control ECU 26 is configured to control the at least one brake actuator to thereby cause the at least one brake actuator to generate brake power based on an operated amount of a brake pedal operated by a driver of the vehicle V when the operation mode of the vehicle V is set to the manual driving mode, thus slowing down the vehicle V based on the generated brake power.

The brake power control ECU 26 is also configured to receive requested brake power from the ECU 10 when the operation mode of the vehicle V is set to the autonomous driving mode, and control the at least one brake actuator to thereby cause the at least one brake actuator to generate brake power that satisfies the requested brake power, thus slowing down the vehicle V based on the generated brake power.

The steering control ECU 28 is configured to control a motor included in a steering mechanism of the vehicle V; the motor of the steering mechanism outputs controlled steering torque that steers the steering wheel of the vehicle V.

Specifically, the steering control ECU 28 is configured to control the motor of the steering mechanism to thereby cause the motor to generate, as the steering torque, controlled assist torque based on an operated amount of the steering wheel operated by a driver of the vehicle V when the operation mode of the vehicle V is set to the manual driving mode. This controlled assist torque assists the driver's steering operation of the steering wheel.

The steering control ECU 28 is also configured to receive a requested steering angle from the ECU 10 when the operation mode of the vehicle V is set to the autonomous driving mode, and control the motor to thereby cause the motor to generate the steering torque that satisfies the requested steering angle.

Next, the following describes an example of the configuration of the ECU 10.

Referring to FIG. 1, the ECU 10 serves as, for example, an autonomous driving control apparatus, and is comprised of, for example, a processing unit, such as a central processing unit (CPU) 2. The ECU 10 can be comprised of another type of processing unit, such as an application specific integrated circuit (ASIC). The ECU 10 is also comprised of a memory 4 including, for example, a non-transitory tangible storage media that include, for example, a random access memory (RAM) and a read only memory (ROM).

Various programs including control programs for causing the CPU 2 to perform various tasks, i.e. routines, are stored in the memory 4. In addition, various data items usable by the CPU 2 are also stored in the memory 4. The CPU 2 reads at least one of the control programs from the memory 4, and executes the at least one control program to thereby execute the routine corresponding to the at least one control program. In other words, the CPU 2 executes the at least one control program to thereby implement predetermined functional modules, such as a drive control unit 6 and a camera monitor unit 8 (see dashed blocks in FIG. 1), based on the at least one control program. In addition, the CPU 2 is configured to control overall operations of the ECU 10.

The drive control unit 6 executes an autonomous driving control task that causes at least one of the ECUs 24, 26, and 28 to autonomously drive the vehicle V when the operation mode of the vehicle V is set to the autonomous driving mode.

Specifically, the ECU 10 sets the operation mode of the vehicle V to the autonomous driving mode when an instruction indicative of autonomous driving is input from a driver of the vehicle V through the input unit 18.

The instruction indicative of the autonomous driving includes, for example, execution information about the autonomous driving to be executed; the execution information includes automatic cruise control (ACC), autonomous steering of the vehicle V, and/or autonomous driving of the vehicle V in a predetermined level of the previously defined levels.

The ACC is configured to adjust the speed of the vehicle V to thereby cause the vehicle V to track a preceding vehicle in front of the vehicle V. The autonomous steering is configured to autonomously control the steering wheel of the vehicle V to thereby cause the vehicle V to travel within the corresponding lane on each of one or more scheduled roads.

The autonomous driving is configured to autonomously drive the vehicle V in the predetermined level of the previously defined levels instructed by the driver of the vehicle V.

Additionally, the drive control unit 6 obtains, from the navigation system 22, (1) The driver's selected route from the current position of the vehicle V to the destination (2) The road information about the one or more roads included in the selected route Then, the drive control unit 6 sets, based on the execution information about the autonomous driving and the road information, autonomous driving conditions required for at least one of the ECUs 24, 26, and 28 to autonomous drive the vehicle V. The autonomous driving conditions include, for example, a value of the speed of the vehicle V, a speed limit, i.e. an upper speed limit, of the vehicle V during autonomous driving, a value of the steering angle of the steering wheel, and a no autonomous-driving zone in one or more scheduled roads.

Additionally, the drive control unit 6 obtains the measurement signals from the respective sensor units 12 and 13, obtains the images from the respective cameras 32w, 32n, and 32t, and also obtains the traffic condition information and weather condition information through the communication module 14. The road information set forth above, the measurement signals, the images, the traffic condition information and weather condition information, which will be collectively referred to as autonomous-driving requirement information items, are obtained from the corresponding devices.

Then, the drive control unit 6 determines a value of at least one of controlled variables for the respective at least one drive actuator, the at least one brake actuator, and the motor of the steering mechanism in accordance with the autonomous driving conditions and the autonomous-driving requirement information items each time receiving the autonomous-driving requirement information items.

Based on the calculated value of at least one of the controlled variables for the respective at least one drive actuator, the at least one brake actuator, and the motor of the steering mechanism, the drive control unit 6 obtains at least one of (1) Requested drive power for the at least one drive actuator (2) Requested brake power for the at least one brake actuator (3) Requested steering angle for the motor Then, the drive control unit 6 outputs, to at least one of the drive power control ECU 24, brake power control ECU 26, and steering control ECU 28, the corresponding at least one of the requested drive power for the at least one drive actuator, requested brake power for the at least one brake actuator, and requested steering angle. This causes at least one of the drive power control ECU 24, brake power control ECU 26, and steering control ECU 28 to execute a corresponding task of the autonomous driving instructed by the driver of the vehicle V.

Note that at least one of the ECUs 24, 26, and 28 serves as, for example, a vehicle control unit configured to determine, based on frame images captured by the respective cameras 32w, 32n, and 32t and the autonomous driving conditions, a value of at least one controlled variable that is needed to cause the vehicle V to autonomously travel.

The above autonomous driving control task of the drive control unit 6 is continuously, i.e. repeatedly, carried out while the operation mode of the vehicle V is set to the autonomous driving mode.

On the other hand, the camera monitor unit 8 is configured to

1. Monitor the operating state of each of the wide-angle camera 32w, narrow-angle camera 32n, and telephoto camera 32t while the drive control unit 6 is executing the autonomous driving control task set forth above 2. Determine whether one of the three cameras 32w, 32n, and 32t has malfunctioned in accordance with the monitored result of each of the three cameras 32w, 32n, and 32t 3. Limit a part of the autonomous driving control task when determining that one of the three cameras 32w, 32n, and 32t has malfunctioned to accordingly enable the autonomous driving of the vehicle V to be continuously carried out Next, the following describes an example of the configuration of the camera module 30, and an example of functions of the camera module 30 with reference to FIGS. 2 and 3.

Figure 2:
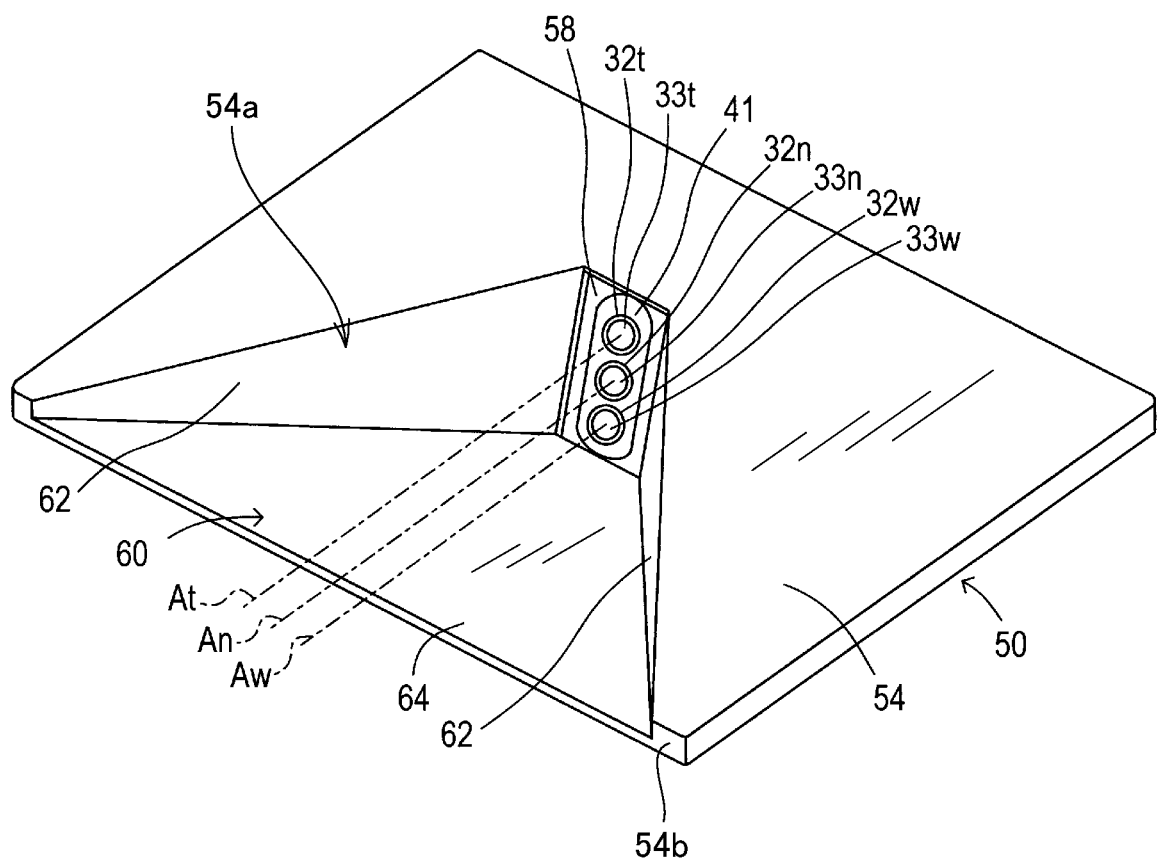
FIG. 2 is a perspective view schematically illustrating an example of the outer appearance of a camera module illustrated in FIG. 1.
Figure 3:
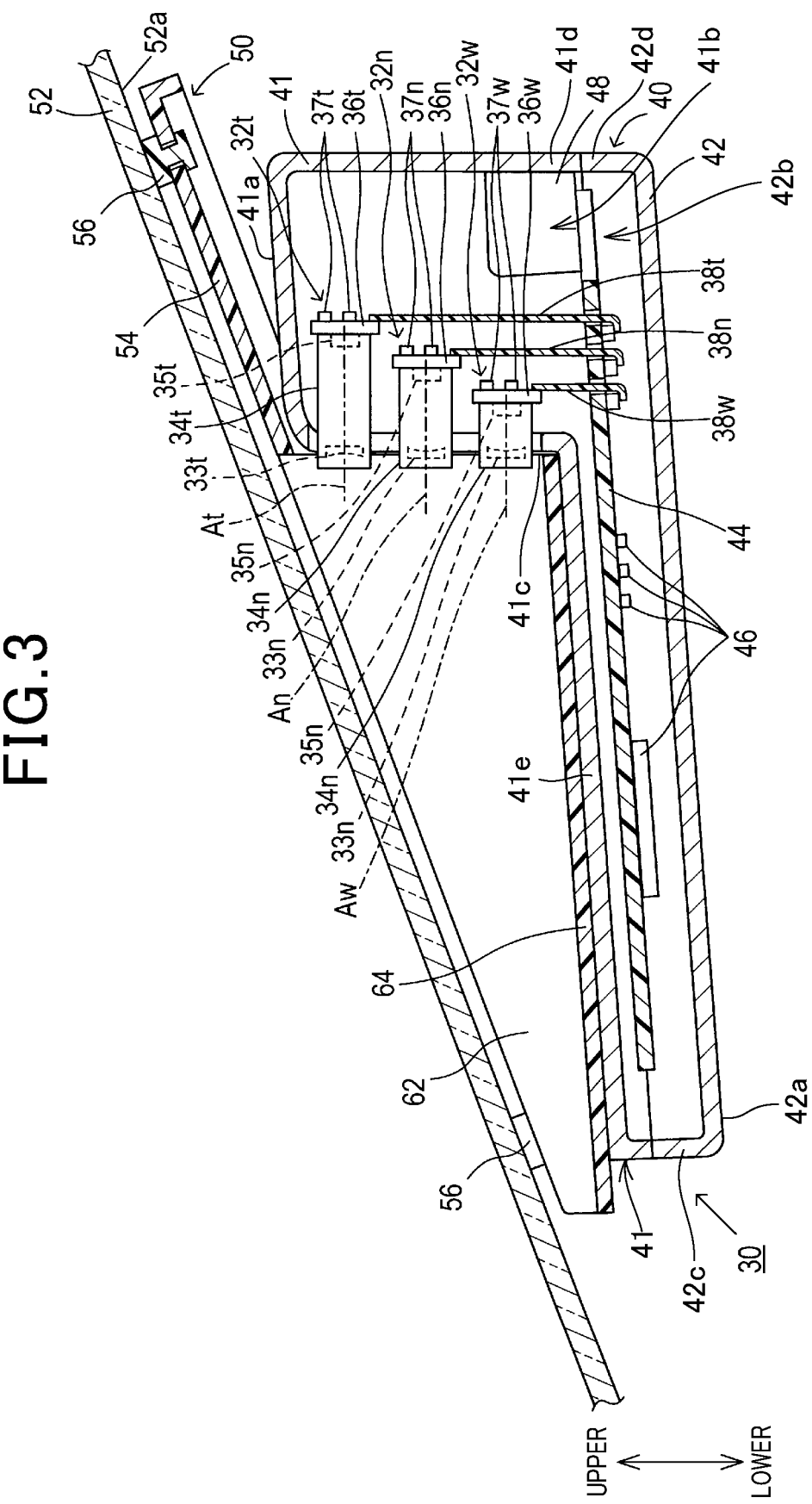
FIG. 3 is a longitudinal cross-sectional view of the camera module for showing an example of the internal structure of the camera module.

Referring to FIGS. 2 and 3, the camera module 30 is comprised of the three cameras 32w, 32n, and 32t, a camera casing 40, and a bracket assembly 50. The three cameras 32w, 32n, and 32t are installed in the camera casing 40.

Each of the cameras 32w, 32n, and 32t includes, for example, a corresponding one of lens barrels 34w, 34n, and 34t having opposing first and second opening ends, and a corresponding one of lenses 33w, 33n, and 33t coaxially located in the corresponding lens barrel to be closer to the first opening end of the corresponding lens barrel. This enables external light entering the lens barrel of each camera 32w, 32n, and 32t through the first opening end to be incident to the corresponding lens 33w, 33n, 33t.

Each of the cameras 32w, 32n, and 32t also includes, for example, an unillustrated lens set located in the corresponding lens barrel to be closer to the second opening end of the corresponding lens barrel. The unillustrated lens set for each camera 32w, 32n, and 32t is configured to, for example, correct light, which has passed through the corresponding lens 33w, 33n, 33t, for optical aberration, such as chromatic aberration, of the corresponding lens 33w, 33n, 33t.

Each of the cameras 32w, 32n, and 32t also includes a corresponding one of imaging devices 35w, 35n, and 35t, and a corresponding one of rectangular plate-like imaging boards 36w, 36n, and 36t.

Each of the imaging boards 36w, 36n, and 36t has opposing first and second major surfaces, and each of the lens barrels 34w, 34n, and 34t is mounted to the first major surface of the corresponding one of the imaging boards 36w, 36n, and 36t. Each of the imaging devices 35w, 35n, and 35t is implemented on the first major surface of the corresponding one of the imaging boards 36w, 36n, and 36t.

Specifically, each of the lens barrels 34w, 34n, and 34t is mounted at the periphery of its second opening end on the first major surface of the corresponding one of the imaging boards 36w, 36n, and 36t such that the corresponding one of imaging devices 35w, 35n, and 35t is coaxial with the optical axis of the corresponding one of the lenses 33w, 33n, and 33t.

Each of the imaging devices 35w, 35n, and 35t is for example configured by a color/monochrome charge-coupled device (CCD) image sensor or a color/monochrome complementary metal oxide semiconductor (CMOS) image sensor. Each of the imaging devices 35w, 35n, and 35t is comprised of a plurality of light receiving elements, which respectively correspond to a plurality of pixels, two-dimensionally arranged in both a vertical direction corresponding to the height direction of the vehicle V and a horizontal direction corresponding to the width direction of the vehicle V. The light receiving elements of each imaging device 35w, 35n, 35t constitute a light receiving surface thereof, and the light receiving surface of each imaging device 35w, 35n, 35t is directed toward, for example, the front end of the vehicle V.

The lens 33w, 33n, 33t of each camera 32w, 32n, 32t is configured to focus light entering the corresponding lens barrel 34w, 34n, 34t on the light receiving surface of the corresponding imaging device 35w, 35n, 35t.

The camera casing 40 is comprised of a first casing segment 41 and a second casing segment 42 that are assembled to constitute the camera casing 40. For example, each of the first and second casing segments 41 and 42 is made of a hard material with a relatively high heat-dissipation capacity, such as aluminum.

The first casing segment 41 has a substantially rectangular cup shape to have a bottom wall 41a, an opening wall 41b opposite to the bottom wall 41a, a first sidewall 41c, and a second sidewall 41d opposite to the first opening sidewall 41c. The first sidewall 41c is comprised of a peripheral edge and an opening defined around the peripheral edge. The peripheral edge is comprised of a first end joined to a corresponding edge of the bottom wall 41a, so that the first sidewall 41c extends to be perpendicular to the bottom wall 41a. Similarly, the second sidewall 41d has a first end joined to a corresponding edge of the bottom wall 41a, so that the second sidewall 41d extends to be perpendicular to the bottom wall 41a.

The first casing segment 41 has a flange 41e extending away from a second end of the first sidewall 41a opposite to the first end thereof in perpendicular to the first sidewall 41a.

The second casing segment 42 has a substantially rectangular dish shape to have a bottom wall 42a, an opening wall 42b opposite to the bottom wall 42a, a first sidewall 42c, and a second sidewall 42d opposite to the first sidewall 42c. The first sidewall 42c has a first end joined to a corresponding edge of the bottom wall 42a, so that the first sidewall 42c extends to be perpendicular to the bottom wall 42a. Similarly, the second sidewall 42d has a first end joined to a corresponding edge of the bottom wall 42a, so that the second sidewall 42d extends to be perpendicular to the bottom wall 42a.

The second casing segment 42 is arranged to face the first casing segment 41 such that a second end of each of the first and second sidewalls 42c and 42d, which is opposite to the first end of the corresponding sidewall, is joined to the second end of the corresponding one of the first and second sidewalls 41c and 41d of the first casing segment 41 with, for example, bolts, thus constituting the camera casing 40 in which an installation space is defined between the first and second casing segments 41 and 42.

The cameras 32w, 32n, and 32t are fixedly mounted through the opening of the first sidewall 41c of the first casing member 41 such that (1) They are aligned in the vertical direction with clearances thereamong (2) The first opening ends of the respective lens barrels 34w, 34n, and 34t are exposed from the first casing member 41

For example, as illustrated in FIGS. 2 and 3, the wide-angle camera 32w is located at the lowermost portion of the first sidewall 41c, the telephoto camera 32t is located at the uppermost portion of the first sidewall 41c, and the narrow-angle camera 32n is located to be higher than the wide-angle camera 32w and lower than the telephoto camera 32t.

The camera casing 40 comprised of the first and second casing segments 41 and 42 is arranged in a compartment of the vehicle V such that the bottom wall 41a and the first sidewall 41c of the first casing segment 41 are located to be close to an inner surface 52a of a front windshield 52 of the vehicle V while the opening wall 41b of the first casing segment 41 is directed toward the lower direction of the vehicle V, and the extending direction of the flange 41e is oriented toward, for example, the front end of the vehicle V.

The bracket assembly 50 is arranged to mount the camera casing 40, i.e. the camera module 30, to a portion of the inner surface 52a of the front windshield 52; the portion of the inner surface 52a of the front windshield 52 has been determined to be out of the way of the driver's view. For example, the bracket assembly 50 is comprised of a bracket 54 and plural mounting pads 56.

The bracket 54 serves to be mounted to the inner surface 52a of the front windshield 52.

The bracket 54 has a substantially rectangular plate-like shape with a substantially trapezoidal concave recess 54a formed in a front side 54b thereof. The bracket 54 has opposing first and second major surfaces, and is arranged in the compartment of the vehicle V such that the first major surface thereof is located alongside the inner surface 52a of the front windshield 52. The mounting pads 56 are distributedly arranged between the inner surface 52a of the front windshield 52 and the first major surface of the bracket 54, so that the bracket 54 is fixedly mounted to the front windshield 52 through the mounting pads 56.

As described above, the cameras 32w, 32n, and 32t are fixedly mounted through the opening of the first sidewall 41c of the first casing member 41 such that (1) The telephoto camera 32t, the narrow-angle camera 32n, and the wide-angle camera 32w are vertically aligned in this order from above (2) The first opening ends of the respective lens barrels 34w, 34n, and 34t are exposed from the first casing member 41

This results in, when the bracket 54, to which the camera module 30 is mounted, is attached to the inner surface 52a of the front windshield 52, optical axes At, An, and Aw of the respective cameras 32t, 32n, and 32w (1) Being aligned vertically in this order from above (2) Extending toward the front end of the vehicle V The concave recess 54a is comprised of a centered inner-peripheral edge corresponding to a shorter side of the trapezoidally-shaped concave recess 54a such that the first sidewall 41c of the first casing segment 41 is located below the centered inner-peripheral edge.

The concave recess 54a is also comprised of a pair of oblique edges respectively extending obliquely outward from both ends of the centered inner-peripheral edges toward, for example, the front end of the vehicle V.

The bracket assembly 50 is also comprised of, for example, a fixture wall 58 integrally extending from the centered inner-peripheral edge of the concave recess 54a downward; the fixture wall 58, which has opposing shorter top and bottom and opposing longer vertical sides, is disposed in the opening of the first sidewall 41c to fix the lens barrels 34w, 34n, and 34t to the peripheral wall of the first sidewall 41c, thus positioning the cameras 32w, 32n, and 32t while their lenses 33w, 33n, and 33t are directed toward, for example, the front of the vehicle V.

The bracket assembly 50 is further comprised of, for example, a pair of oblique sidewalls 62 integrally extending from the respective oblique edges of the concave recess 54a downward. In other words, each of the oblique sidewalls 62, which has opposing top and bottom, is located such that the top of each of the oblique sidewalls 62 is joined to the corresponding one of the oblique edges of the concave recess 54a.

The oblique sidewalls 62 extend obliquely outward along the respective oblique edges of the concave recess 54a from both the longer vertical sides of the fixture wall 58 toward, for example, the front end of the vehicle V while centering around the optical axes At, An, and Aw of the respective cameras 32t, 32n, and 32w and being tapered.

Additionally, the bracket assembly 50 is comprised of, for example, a base wall 64 having a substantially trapezoidal shape that extends obliquely outward from the bottom of the fixture wall 58 toward, for example, the front of the vehicle V below the optical axes At, An, and Aw of the respective cameras 32t, 32n, and 32w. In other words, the base wall 64 has opposing unparallel sides that are joined to the bottoms of the respective oblique sidewalls 62.

That is, the oblique sidewalls 62 and the base wall 64 joined thereto surround the optical axes At, An, and Aw of the respective cameras 32t, 32n, and 32w, resulting in the assembly of the oblique sidewalls 62 and the base wall 64 constituting a hood 60 for preventing light entering from outside of the walls 62 and 64.

This therefore enables light from the forward direction of vehicle V to be incident to the cameras 32w, 32n, and 32t via the front windshield 52, so that the incident light is received by each of the cameras 32w, 32n, and 32t.

The light received by each of the cameras 32w, 32n, and 32t is focused by the corresponding lens 33w, 33n, 33t and unillustrated lens set on the light receiving surface of the corresponding imaging device 35w, 35n, 35t, so that each of the two-dimensionally arranged light-sensitive elements (pixels) receives a corresponding light component during a controllable shutter time, i.e. an exposure duration. Then, each of the light-sensitive elements converts a corresponding received light component into an electrical charge, i.e. an electrical signal, corresponding to the intensity of the received light component, thus generating the electric signals as received light data, i.e. capturing a two-dimensional frame image.

In addition, the camera module 30 includes a control circuit board 44 made of a rigid substrate, such as a glass epoxy substrate, and having a substantially rectangular plate-like shape. The control circuit board 44 is installed in the installation space defined between the first and second casing segments 41 and 42. The control circuit board 44 includes a control circuit 46 comprised of many electric and/or electronic elements.

Each of the cameras 32w, 32n, and 32t additionally includes a corresponding one of imaging circuits 37w, 37n, and 37t implemented to the corresponding one of the imaging boards 36w, 36n, and 36t.

Each of the imaging circuits 37w, 37n, and 37t is communicably connected to the corresponding one of the imaging devices 35w, 35n, and 35t. Each of the imaging circuits 37w, 37n, and 37t is also communicably connected to the control circuit 46 implemented to the control circuit board 44 via, for example, a corresponding one of flexible printed circuit boards (FPC) 38w, 38n, and 38t.

Specifically, the control circuit 46 is configured to control the corresponding imaging device 35w, 35n, and 35t of each camera 32w, 32n, 32t in accordance with, for example, a predetermined value of the exposure duration, i.e. shutter time, and a predetermined value of a frame rate, cooperatively with the corresponding imaging circuit 37w, 37n, 37t to thereby cause the corresponding imaging device 35w, 35n, and 35t to successively capture two-dimensional frame images from the surrounding region around the vehicle V. Then, the control circuit 46 receives, as image data items, the two-dimensional frame images successively captured by each of the cameras 32w, 32n, and 32t.

The control circuit 46 obtains the image data items from each of the cameras 32w, 32n, and 32t, and performs, based on the image data items, various tasks including an image recognition task that (1) Recognizes lane markers on a scheduled road on which the vehicle V is scheduled to travel (2) Recognizes objects existing in the surrounding region around the vehicle V Objects recognizable by the image recognition task can include, for example, obstacles, such as pedestrians, bicycles, and other vehicles, and structures, such as traffic signals, traffic signs, and/or buildings.

The camera module 30 includes at least one connector 48 mounted to the control circuit board 44. The control circuit 46 is communicably connected to the ECU 10 via the at least one connector 48. The control circuit 46 is configured to output, to the ECU 10, the image data items obtained by each camera 32w, 32n, 32t and the results of the image recognition task via the at least one connector 48 in response to commands sent from the ECU 10.

Figure 4:
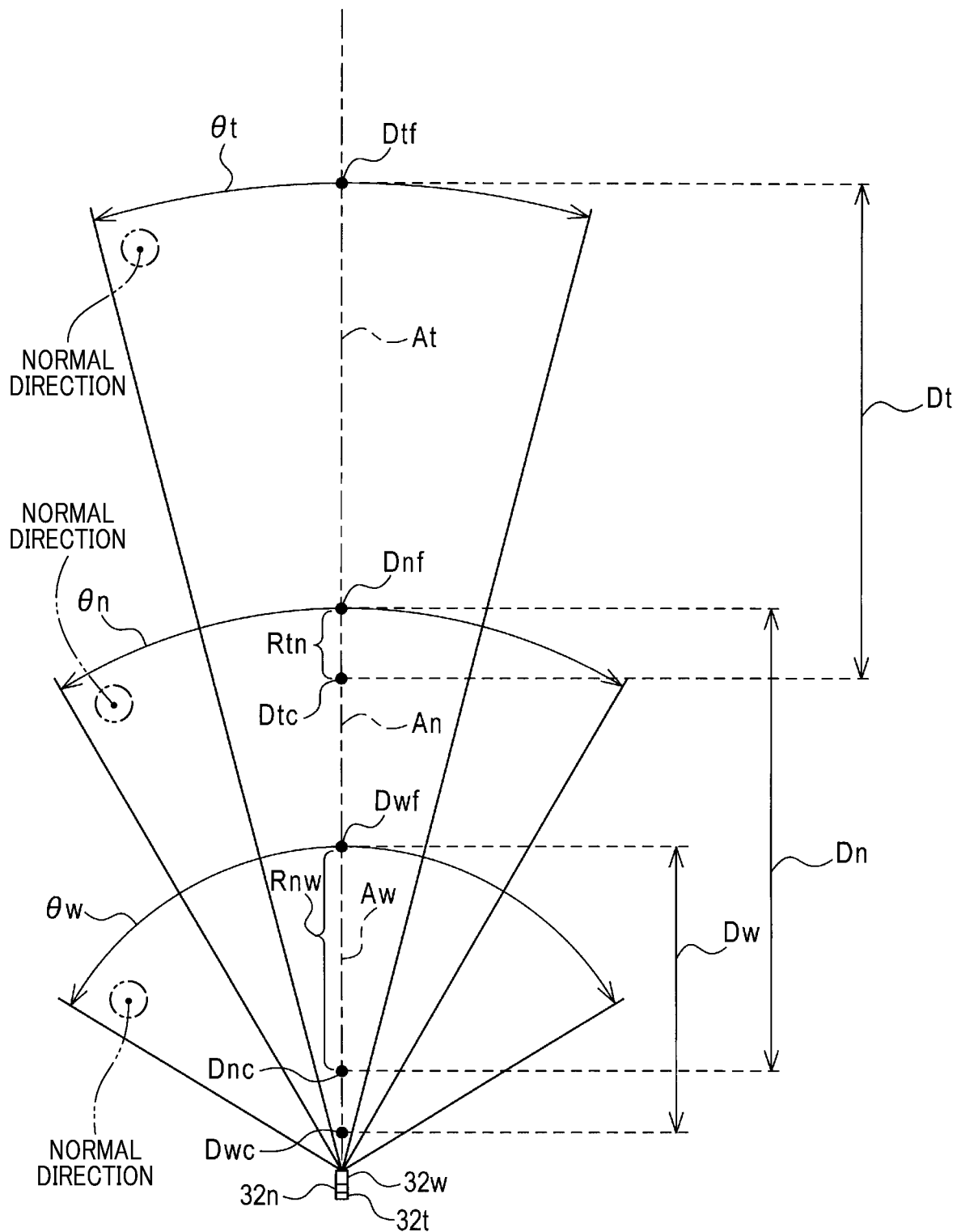
FIG. 4 is a view schematically illustrating an example of the relationship among (1) A set of an angular field of view and a depth of field of a wide-angle camera of the camera module (2) A set of an angular field of view and a depth of field of a narrow-angle camera of the camera module (3) A set of an angular field of view and a depth of field of a telephoto camera of the camera module.

In particular, referring to FIG. 4, each of the cameras 32w, 32n, and 32t has a corresponding one of imaging regions that are at least partly different from each other.

Specifically, the lens 33w and the imaging device 35w of the camera 32w are configured to capture an image of a first imaging region defined around the optical axis Aw, and the lens 33n and the imaging device 35n of the camera 32n are configured to capture an image of a second imaging region defined around the optical axis An, which is at least partly different from the first imaging region. Similarly, the lens 33t and the imaging device 35t of the camera 32t are configured to capture an image of a third imaging region defined around the optical axis At, which is at least partly different from the first and second imaging regions.

Each of the first to third imaging regions corresponds to, for example, a corresponding one of first to third directional regions, such as forward regions in the travelling direction of the vehicle V.

For example, the lens 33w of the wide-angle camera 32w is comprised of a wide-angle lens configured as, for example, a concave meniscus lens made of, for example, a transparent material, such as glass. The lens 33w is arranged such that its concave major surface is directed toward the imaging device 35w.

The lens 33n of the narrow-angle camera 32n is comprised of, for example, a narrow-angle lens having an angular field of view θn narrower than an angular field of view θw of the lens 33w of the wide-angle camera 32w. The lens 33n is configured as, for example, a concave meniscus lens made of, for example, a transparent material, such as glass. The lens 33n is arranged such that its concave major surface is directed toward the imaging device 35n.

Additionally, the lens 33t of the telephoto camera 32t is a comprised of, for example, a telephoto lens having an angular field of view θt narrower than the angular field of view θn of the lens 33n of the narrow-angle camera 32n. The lens 33t is configured as, for example, a concave lens made of, for example, a transparent material, such as glass. The lens 33t is arranged such that its concave major surface is directed toward the front end of the vehicle V.

Because the wide-angle camera 32w uses the wide-angle lens 33w, the angular field of view θw of the lens 33w of the wide-angle camera 32w is set to a relatively wide angle of, for example, 120 degrees. The wide-angle camera 32w has a depth of field Dw within the angular field of view θw of the wide-angle lens 33w; the depth of field Dw is set to be within the range from a predetermined close point Dwc, which is, for example, a point of the closest focus of the wide-angle lens 33w, and a predetermined far point Dwf, which is, for example, a point of the farthest focus of the wide-angle lens 33w.

The lens barrel 34n of the narrow-angle camera 32n is positioned in the first casing segment 41 such that at least a predetermined rear principal point of the narrow-angle lens 33n is vertically and horizontally aligned with a corresponding predetermined rear principal point of the wide-angle lens 33w. Additionally, the optical axis An of the narrow-angle camera 32n is eccentrically adjusted with respect to the optical axis Aw of the wide-angle camera 32w in the vertical direction to thereby maintain the horizontal position of the optical axis An of the narrow-angle camera 32n vertically aligning with the horizontal position of the optical axis Aw.

Because the narrow-angle camera 32n uses the narrow-angle lens 33n, the angular field of view θn of the lens 33n of the narrow-angle camera 32n is set to a middle angle narrower than the angular field of view θw of the lens 33w, such as, for example, 60 degrees. These settings enable the angular field of view θn of the lens 33n of the narrow-angle camera 32n to be partially overlap with the angular field of view θw of the lens 33w of the wide-angle camera 32w in the normal direction perpendicular to the corresponding angular fields of view.

The narrow-angle camera 32n has a depth of field Dn within the angular field of view θn of the narrow-angle lens 33n; the depth of field Dn is set to be within the range from a predetermined close point Dnc, which is, for example, a point of the closest focus of the narrow-angle lens 33n, and a predetermined far point Dnf, which is, for example, a point of the farthest focus of the narrow-angle lens 33n.

In particular, the far point Dwf of the wide-angle camera 32w is set to be farther from a driver of the vehicle V than the close point Dnc of the narrow-angle camera 32n therefrom, and the close point Dnc of the narrow-angle camera 32n is set to be farther from a drive of the vehicle V than the close point Dwc of the wide-angle camera 32w therefrom. Additionally, the far point Dnf of the narrow-angle camera 32n is set to be farther from a driver of the vehicle V than the far point Dwf of the wide-angle camera 32w therefrom.

These settings enable (1) The far point Dwf of the wide-angle camera 32w to be located between the close and far points Dnc and Dnf of the narrow-angle camera 32n (2) An overlap region Rnw, in which the depth of field Dn of the narrow-angle camera 32n and the depth of field Dw of the wide-angle camera 32w overlap with each other in the normal direction perpendicular to the corresponding angular fields of view, to be established The lens barrel 34t of the telephoto camera 32t is positioned in the first casing segment 41 such that at least a predetermined rear principal point of the telephoto lens 33t is vertically and horizontally aligned with a corresponding predetermined rear principal point of the narrow-angle lens 33n. Additionally, the optical axis At of the telephoto camera 32t is eccentrically adjusted with respective to each of the optical axis Aw of the wide-angle camera 32w and the optical axis An of the narrow-angle camera 32n in the vertical direction to thereby maintain the horizontal position of the optical axis At of the telephoto camera 32t vertically aligning with the horizontal position of each of the optical axis Aw and the optical axis An.

Because the telephoto camera 32t uses the telephoto lens 33t, the angular field of view θt of the lens 33t of the telephoto camera 32t is set to a small angle narrower than each of the angular field of view θw of the lens 33w and the angular field of view θn of the lens 33n, such as, for example, 35 degrees. These settings enable (1) The angular field of view θt of the lens 33t of the telephoto camera 32t to partly overlap with the angular field of view θn of the lens 33n of the narrow-angle camera 32n in the normal direction perpendicular to the corresponding angular fields of view (2) The angular field of view θt of the lens 33t of the telephoto camera 32t to partly overlap with the angular field of view θw of the lens 33w of the wide-angle camera 32w in the normal direction perpendicular to the corresponding angular fields of view The telephoto camera 32t has a depth of field Dt within the angular field of view θt of the telephoto lens 33t; the depth of field Dt is set to be within the range from a predetermined close point Dtc, which is, for example, a point of the closest focus of the telephoto lens 33t, and a predetermined far point Dtf, which is, for example, a point of the farthest focus of the telephoto lens 33t.

In particular, the far point Dnf of the narrow-angle camera 32n is set to be farther from a driver of the vehicle V than the close point Dtc of the telephoto camera 32t, and the close point Dtc of the telephoto camera 32t is set to be farther from a driver of the vehicle V than (1) The close point Dnc of the narrow-angle camera 32n therefrom (2) Each of the close point Dwc and the far point Dwf of the wide-angle camera 32w therefrom Additionally, the far point Dtf of the telephoto camera 32t is set to be farther from a driver of the vehicle V than (1) The far point Dnf of the narrow-angle camera 32n therefrom (2) The far point Dwf of the wide-angle camera 32w therefrom These settings enable (1) The far point Dnf of the narrow-angle camera 32n to be located between the close and far points Dtc and Dtf of the telephoto camera 32t (2) An overlap region Rtn, in which the depth of field Dt of the telephoto camera 32t and the depth of field Dn of the narrow-angle camera 32*n* overlap with each other in the normal direction of the corresponding angular fields of view, to be established In particular, the far point Dwf of the telephoto camera 32*w* is arranged to be outside a region defined between the close and far points Dtc and Dtf of the telephoto camera 32*t*, so that the depth of field Dt of the telephoto camera 32*t* and the depth of field Dw of the wide-angle camera 32*w* deviate from each other. This results in the depth of field Dt of the telephoto camera 32*t* and the depth of field Dw of the wide-angle camera 32*w* having non-overlap with each other in the normal direction of the corresponding angular fields of view.

As described above, the wide-angle camera 32*w*, the narrow-angle camera 32*n*, and the telephoto camera 32*t* are arranged in the camera module 30 such that the horizontal positions of the rear principle points of the respective cameras 32*w*, 32*n*, and 32*t* are aligned with each other in the vertical direction, i.e. the height direction, of the vehicle V.

The wide-angle camera 32*w*, the narrow-angle camera 32*n*, and the telephoto camera 32*t*, which are configured to include the respective wide-angle lens 33*w*, narrow-angle lens 33*n*, and telephoto lens 33*t*, enable the angular fields of view θw, θn, and θt to be different from each other while partly overlapping with each other in the normal direction perpendicular to the corresponding angular fields of view.

The depths of field within the respective angular fields of each adjacent pair of the cameras 32*w*, 32*n*, and 32*t* are configured to partly overlap with each other in the normal direction perpendicular to the corresponding angular fields of view.

Note that the exemplary embodiment defines the imaging region of the wide-angle camera 32*w*, which is referred to as a wide-angle imaging region, as a combination of the angular field of view θw and the corresponding depth of field Dw, and also defines the imaging region of the narrow-angle camera 32*n*, which is referred to as a narrow-angle imaging region, as a combination of the angular field of view θn and the corresponding depth of field Dn. In addition, the exemplary embodiment defines the imaging region of the telephoto camera 32*t*, which is referred to as a telephoto imaging region, as a combination of the angular field of view θt and the corresponding depth of field Dt.

These definitions therefore result in the wide-angle imaging region of the wide-angle camera 32*w*, the narrow-angle imaging region of the narrow-angle camera 32*n*, and the telephoto imaging region of the telephoto camera 32*t* being different from each other while partly overlapping with each other in the normal direction perpendicular to the corresponding angular fields of view.

In particular, because the wide-angle imaging region, the telephoto imaging region, and the narrow-angle imaging region, respectively cover a relatively closer region around the vehicle V, a relatively farther region around the vehicle V, and a middle region around the vehicle V between the relatively closer region and the relatively farther region.

Partial overlap among the wide-angle imaging region, the narrow-angle imaging region, and the telephoto imaging region results in frame images, which are captured by the respective cameras 32*w*, 32*n*, and 32*t* based on their imaging regions, including a common region thereamong.

The control circuit 46 is configured to perform a known alignment task based on (1) A first reference image of the wide-angle imaging region (2) A second reference image of the narrow-angle imaging region (3) A third reference image of the telephoto imaging region The known alignment task enables misalignment among the positions, i.e. positional coordinates, of the respective optical axes Aw, An, and At to be corrected based on the first to third reference images.

That is, the ECU 10 is configured to use two-dimensional frame images, i.e. closer images, of the wide-angle imaging region captured by the camera 32*w*, two-dimensional images, i.e. middle images, of the narrow-angle imaging region captured by the camera 32*n*, and two-dimensional images, i.e. farther images, of the telephoto imaging region captured by the camera 32*t* to thereby recognize objects existing around the vehicle V. That is, the ECU 10 enables objects existing over a wide range from the relatively closer region around the vehicle V to the relatively farther region around the vehicle V to be easily recognized.

Additionally, because the wide-angle imaging region, the narrow-angle imaging region, and the telephoto imaging region partly overlap with each other, the closer images of the wide-angle imaging region, the middle images of the narrow-angle imaging region, and the farther images of the telephoto imaging region partly overlap with other. This therefore prevents misrecognition of an object existing in at least one of overlap areas among the first to third images even if the object is moving the at least one of the overlap areas, thus recognizing the object with higher accuracy.

As described above, the camera module 30, which is comprised of the three cameras 32*w*, 32*n*, and 32*t*, enables the ECU 10 to recognize, with higher accuracy, lane markers on a scheduled road of the vehicle V and/or objects existing in the surrounding region around the vehicle V.

However, if at least one of the cameras 32*w*, 32*n*, and 32*t* of the camera module 30 has malfunctioned, the recognition accuracy of lane markers and/or objects in a corresponding one of the relatively closer, farther, and middle regions around the vehicle V may decrease. If the ECU 10 continuously carried out autonomous driving of the vehicle V in cooperation with the other ECUs 24, 26, and 28 with decreasing recognition accuracy in one of the relatively closer, farther, and middle regions around the vehicle V, it would be difficult to perform autonomous driving of the vehicle V accordingly, i.e. reliably and safely.

Figure 5:
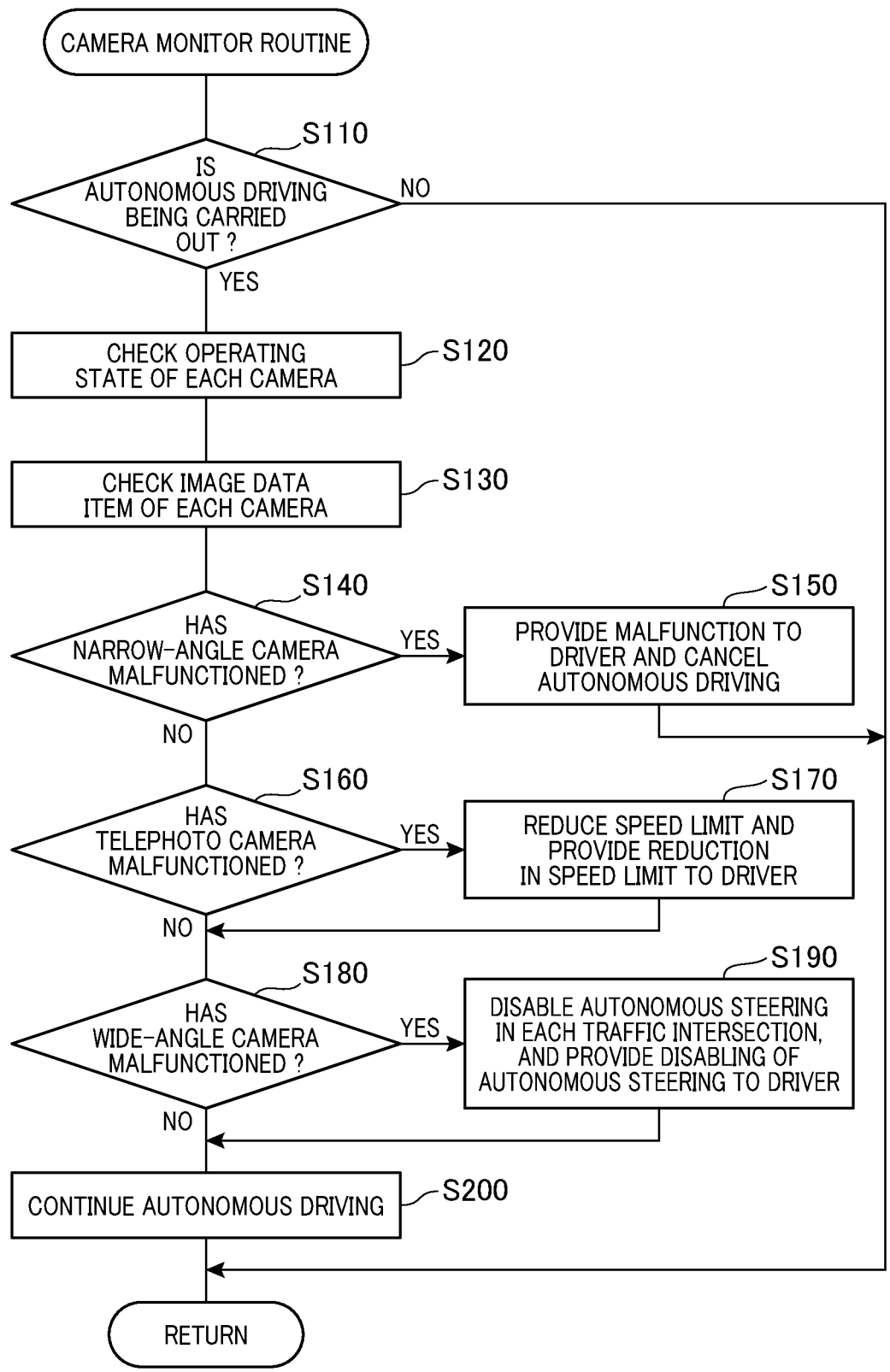
FIG. 5 is a flowchart schematically illustrating a camera monitor routine according to the exemplary embodiment of the present disclosure.

From this viewpoint, the camera monitor unit 8 of the ECU 10 is configured to monitor each of the cameras 32*w*, 32*n*, and 32*t* to thereby determine whether each of the cameras 32*w*, 32*n*, and 32*t* is operating normally during autonomous driving of the vehicle V. The camera monitor unit 8 is also configured to (1) Discontinue the autonomous driving of the vehicle V upon determining that the camera 32*n* has malfunctioned (2) Limit, upon determining that one of the cameras 32*t* and 32*w* has malfunctioned, the autonomous driving conditions set by the drive control unit 6 in accordance with the imaging area of the malfunctioning camera while continuing the autonomous driving of the vehicle V As described above, the CPU 2 executes instructions of the at least one control program stored in the memory 4 to thereby implement the functions of the camera monitor unit 8. In other words, the CPU 2 executes instructions of the at least one control program to thereby serve as the camera monitor unit 8 to execute a camera monitor routine illustrated as a flowchart in FIG. 5 every predetermined control period.

When starting the camera monitor routine as a main routine, the CPU 2 determines whether the ECUs 24, 26, and 28 is carrying out the autonomous driving of the vehicle V based on the autonomous driving conditions set thereby in step S110. The CPU 2 terminates the camera monitor routine upon determining that the ECUs 24, 26, and 28 is not carrying out the autonomous driving of the vehicle V (NO in step S110).

Otherwise, upon determining that the ECUs 24, 26, and 28 is carrying out the autonomous driving of the vehicle V (YES in step S110), the CPU 2 sends, to the control circuit 46 of the camera module 30, a communication request for each of the cameras 32w, 32n, and 32t, and receives, from each of the cameras 32w, 32n, and 32t via the control circuit 46, a response signal indicative of the operating state of the corresponding one of the cameras 32w, 32n, and 32t to thereby check whether the corresponding one of the cameras 32w, 32n, and 32t is operating in step S120.

In addition, upon determining that the ECUs 24, 26, and 28 is carrying out the autonomous driving of the vehicle V (YES in step S110), the CPU 2 obtains, from each of the cameras 32w, 32n, and 32t via the control circuit 46, an image data item, i.e. a frame image captured by the corresponding one of the cameras 32w, 32n, and 32t to thereby check whether the image data item obtained from the corresponding one of the cameras 32w, 32n, and 32t is a normally captured image data item in step S130.

Note that the CPU 2 can carry out the operation in step S120 and the operation in step S130 in random order or carry out the operation in step S120 and the operation in step S130 in parallel.

Additionally, the CPU 2 can directly receive the response signal from each of the cameras 32w, 32n, and 32t, and/or directly receive the image data item from each of the cameras 32w, 32n, and 32t.

After the operation check of each camera 32w, 32n, 32t in step S120 and the image-data check of each camera 32w, 32n, 32t in step S130 are completed, the CPU 2 determines, based on the checked results in steps S120 and S130, whether the narrow-angle camera 32n has malfunctioned in step S140.

Specifically, the CPU 2 determines that the narrow-angle camera 32n has malfunctioned upon determining that the checked result in step S120 represents that the camera 32n is not operating due to, for example, no response signal is returned from the camera 32n. In addition, the CPU 2 determines that the narrow-angle camera 32n has malfunctioned upon determining that the checked result in step S130 represents that the image data item obtained from the camera 32n is an abnormally captured image due to, for example, overexposure of the camera 32n, underexposure of the camera 32w, damages of the lens 33n, and/or duty on the lens 33n. Note that the CPU 2 can determine that the image data item obtained from the camera 32w is an abnormally captured image based on, for example, a pixel value, i.e. a luminance value, of each pixel of the imaging device 35n representing the intensity of the corresponding received light component.

Upon determining that the camera 32n has malfunctioned (YES in step S140), the CPU 2 visibly and/or audibly outputs, to a driver of the vehicle V through the output unit 17, a message indicative of the camera 32w having malfunctioned, thus urging a driver of the vehicle V to discontinue the autonomous driving of the vehicle V in step S150.

That is, the operation in step S150 prompts a driver of the vehicle V to instruct the ECU 10 to switch the operation mode of the vehicle V from the autonomous driving mode to the manual driving mode using the input unit 18, thus discontinuing the autonomous driving of the vehicle V.

Alternatively, the CPU 2 can perform an emergency braking control task to thereby forcibly stop the vehicle V in step S150 for example if a driver of the vehicle V does not start driving of the vehicle V in the manual driving mode. For example, the emergency braking control task is configured to cause the ECUs 22, 24, and 26 to safely pull the vehicle V over to a safe place while outputting brake power to thereby decelerate the vehicle V, thus autonomously parking the vehicle V at the safe place.

That is, the exemplary embodiment disables the drive control unit 6 from executing the autonomous driving control task, thus discontinuing the autonomous driving of the vehicle V upon it being determined that there is a malfunction or fault in the narrow-angle camera 3nw so that it is difficult to obtain frame images on the middle region around the vehicle V, which is needed for autonomous driving of the vehicle V. This therefore ensures the safety of the vehicle V.

Otherwise, upon determining that the camera 32n has not malfunctioned (NO in step S140), the CPU 2 determines, based on the checked results in steps S120 and S130, whether the telephoto camera 32t has malfunctioned in step S160.

Specifically, the CPU 2 determines that the telephoto camera 32t has malfunctioned upon determining that the checked result in step S120 represents that the camera 32t is not operating due to, for example, no response signal is returned from the camera 32t. In addition, the CPU 2 determines that the telephoto camera 32t has malfunctioned upon determining that the checked result in step S130 represents that the image data item obtained from the camera 32t is an abnormally captured image due to, for example, overexposure of the camera 32t, underexposure of the camera 32t, damage to the lens 33t, and/or dirt on the lens 33t. Note that the CPU 2 can determine that the image data item obtained from the camera 32t is an abnormally captured image based on, for example, a pixel value of each pixel of the imaging device 35t representing the intensity of the corresponding received light component.

Upon determining that the camera 32t has malfunctioned (YES in step S160), the CPU 2 reduces the speed limit in the autonomous driving conditions to be lower by a predetermined speed to accordingly limit the speed of the vehicle V during the autonomous driving of the vehicle V, i.e. limit, i.e. tighten, the autonomous driving conditions, in step S170.

Additionally, the CPU 2 visibly and/or audibly outputs, to a driver of the vehicle V through the output unit 17, a message indicative of at least one of information about the upper speed limit of the vehicle V being limited or the changed upper speed limit in step S170. In addition, the CPU 2 can visibly and/or audibly output, to a driver of the vehicle V through the output unit 17, a message indicative of the camera 32t having malfunctioned in step S170.

The reason why to reduce the speed limit upon the telephoto camera 32t having malfunctioned is that the malfunction of the telephoto camera 32t may make it difficult to recognize, from the closer and middle images captured by the wide- and narrow-angle cameras 32w and 32n, objects existing in the relatively farther region covered by the telephoto camera 32t.

That is, even if objects existing in the relatively closer region and the middle region are recognized based on the closer and middle images, an increase of the speed of the vehicle V may cause a delay in recognition of objects existing in the relatively farther region, causing sudden braking and/or sudden steering of the vehicle V.

From this viewpoint, restricting the speed limit in step S170 prevents travelling of the vehicle V in the autonomous driving mode from becoming unstable.

Otherwise, upon determining that the camera 32t has not malfunctioned (NO in step S160), the CPU 2 determines, based on the checked results in steps S120 and S130, whether the wide-angle camera 32w has malfunctioned in step S180.

Specifically, the CPU 2 determines that the wide-angle camera 32w has malfunctioned upon determining that the checked result in step S120 represents that the camera 32w is not operating due to, for example, no response signal is returned from the camera 32w. In addition, the CPU 2 determines that the wide-angle camera 32w has malfunctioned upon determining that the checked result in step S130 represents that the image data item obtained from the camera 32w is an abnormally captured image due to, for example, overexposure of the camera 32w, underexposure of the camera 32w, damages of the lens 33w, and/or duty on the lens 33w. Note that the CPU 2 can determine that the image data item obtained from the camera 32w is an abnormally captured image based on, for example, a pixel value of each pixel of the imaging device 35w representing the intensity of the corresponding received light component.

Upon determining that the camera 32w has malfunctioned (YES in step S180), the CPU 2 disables autonomous steering of the vehicle V in each traffic intersection in the scheduled road to accordingly limit, i.e. tighten, an autonomous-driving execution condition included in the autonomous driving conditions in step S190.

Additionally, the CPU 2 visibly and/or audibly outputs, to a driver of the vehicle V through the output unit 17, a message indicative of at least one of information about inexecution of autonomous steering in each traffic intersection in step S190. In addition, the CPU 2 can visibly and/or audibly outputs, to a driver of the vehicle V through the output unit 17, a message indicative of the camera 32w having malfunctioned in step S190.

That is, the malfunction of the wide-angle camera 32w may make it difficult to recognize, from the farther and middle images captured by the wide- and narrow-angle cameras 32t and 32n, objects existing in the relatively closer region covered by the wide-angle camera 32w. This therefore would reduce the safety of the autonomous driving of the vehicle V if an autonomous left turn or an autonomous right turn of the vehicle V based on the autonomous driving of the vehicle V were carried out in a traffic intersection while there is a malfunction in the wide-angle camera 32w.

From this viewpoint, disabling autonomous steering of the vehicle V in each traffic intersection and informing a driver of the vehicle V about prohibition of autonomous-steering in each traffic intersection in step S190 enable a driver of the vehicle V to drive the vehicle V in the manual driving mode, thus ensuring the safety of the vehicle V.

Note that the CPU 2 can limit, i.e. tighten, the autonomous driving conditions to thereby permit the vehicle V to travel straight in each traffic intersection while setting the speed of the vehicle V to be lower than the speed limit set in step S19 for example if a driver of the vehicle V does not start driving of the vehicle V in the manual driving mode.

Otherwise, upon determining that the camera 32w has not malfunctioned (NO in step S180), the CPU 2 serves as the drive control unit 6 to continuously carry out the autonomous driving of the vehicle V in step S200, thus terminating a current cycle of the camera monitor routine.

Note that the CPU 2 can carry out the operation in step S140 and the operation in step S160 in random order.

As described above, the camera monitor unit 8 of the ECU 10 of the exemplary embodiment is configured to (1) Check whether at least one of the wide-angle camera 32w, the narrow-angle camera 32n, and the telephoto camera 32t has malfunctioned (2) Limit the speed of the vehicle V as one of the autonomous driving conditions required for autonomous driving of the vehicle V upon it being determined that the telephoto camera 32t has malfunctioned to thereby continuously carry out the autonomous driving of the vehicle V (3) Disable autonomous steering of the vehicle V in each traffic intersection as one of the autonomous driving conditions required for autonomous driving of the vehicle V upon it being determined that the wide-angle camera 32n has malfunctioned to thereby limit autonomous driving tasks executable in each traffic intersection while continuously carrying out the autonomous driving of the vehicle V This therefore enables the drive control unit 6 of the ECU 10 to continuously carry out autonomous driving of the vehicle V while limiting the autonomous driving conditions even if it is determined by the camera monitor unit 8 that the telephoto camera 32t or the wide-angle camera 32w has malfunctioned.

Consequently, the ECU 10 of the exemplary embodiment is configured to eliminate the need to discontinue, i.e. cancel, the autonomous driving of the vehicle V, and switch the operation mode of the vehicle V from the autonomous driving mode to the manual driving mode even if at least one of the telephoto camera 32t or the wide-angle camera 32w has malfunctioned. That is, this configuration of the ECU 10 enables autonomous driving of the vehicle V to be continuously carried out based on the limited autonomous driving conditions as long as at least the narrow-angle camera 32n is operating normally. This therefore produces an autonomous driving system 1 being more convenient for driving of the vehicle V.

The present disclosure is not limited to the above exemplary embodiment set forth above, and can be variously modified for example as follows.

The camera module 30 of the exemplary embodiment is comprised of the three cameras, i.e. the wide-angle camera 32w, narrow-angle camera 32n, and telephoto camera 32t, but the present disclosure is not limited thereto.

Specifically, the camera module 30 can be comprised of a first camera including a normal lens or a standard lens, and a second camera including a telephoto lens whose angular field of view is narrower than an angular field of view of the normal lens. Note that the normal or standard lens is defined as a lens that has a focal length equal or close to the diagonal of the light receiving area of a corresponding imaging device.

Additionally, the camera module 30 can be comprised of four cameras that respectively capture an upper part, a lower part, a right part, and a left part of a front view, i.e. front imaging region, of the vehicle V.

That is, the camera module 30 can include plural cameras with respectively different imaging regions from each other around the vehicle V, and can be configured such that images captured from the respective different imaging regions enable one or more objects existing in at least one of the imaging regions to be recognized. At that time, if some cameras have malfunctioned, the camera monitor unit 6 can be configured to limit the autonomous driving conditions. This enables the drive control unit 6 to continuously carry out the autonomous driving of the vehicle V.

At least one of the autonomous driving conditions, which is limited by the ECU 10, can be selected by the ECU 10 depending on which of the plural cameras has malfunctioned.

For example, let the camera module 30 be comprised of four cameras that respectively capture an upper part, a lower part, a right part, and a left part of a front view, i.e. front imaging region, of the vehicle V in the travelling direction. In this case, if the camera for capturing the right part of the front view has malfunctioned, the ECU 10 can be configured to limit changing of a currently travelling lane of the vehicle V to an adjacent right-side lane of the currently travelling lane, and/or right turn of the vehicle V.

The plural imaging regions of plural cameras can be configured to at least partly overlap with each other as described in the exemplary embodiment. This configuration prevents the ECU 10 from missing an object even if the object has moved over at least one of boundaries between the overlapping imaging regions.

The cameras 32w, 32n, and 32t, which are installed in the camera casing 40, can be directly mounted to the vehicle V.

The CPU 2 of the ECU 10 of the exemplary embodiment executes the at least one control program to thereby implement functions as the drive control unit 6 and functions as the camera monitor unit 8.

In contrast, the control circuit 46 of the camera module 30 can be configured to implement the functions as the functions as the camera monitor unit 8, and the ECU 10 can be configured to implement the functions as the drive control unit 6. In this modification, if the control circuit 46 of the camera module 30 is comprised of a microcomputer, the microcomputer of the control circuit can execute at least one control program stored therein to thereby execute the camera monitor routine illustrated in FIG. 5 corresponding to the at least one control program as the functions of the camera monitor unit 8. That is, the control circuit 46 of the camera module 30 can serve as, for example, the camera monitor unit 8.

That is, at least part of all functions provided by the ECU 10 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions While the illustrative embodiment of the present disclosure has been described herein, the present disclosure is not limited to the embodiment and its modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiment and its modifications can be replaced with a known structure having the same function as the corresponding technical feature. Each of the technical features described in the embodiment and its modifications can also be combined with at least one of the other technical features. At least one of the technical features described in the embodiment and its modifications can further be eliminated unless the at least one of the technical features is described as an essential element in the present specification.

The functions of the drive control unit and the camera monitor unit can be implemented by various embodiments; the various embodiments include autonomous driving control ECUs, camera modules, programs for serving a computer as the functions, storage media, such as non-transitory media, storing the programs, and autonomous driving control methods.

What is claimed is:

1. An autonomous driving control apparatus installable in a vehicle that includes: at least a wide-angle camera and a narrow-angle camera configured to respectively capture at least a wide-angle image and a narrow-angle image of at least a wide-angle directional region and a narrow-angle directional region that are at least partly different from each other from the vehicle; and a vehicle control unit configured to control a travelling state of the vehicle, the wide-angle camera having a predetermined wide-angle field of view, the narrow-angle camera having a predetermined narrow-angle field of view that is narrower than the wide-angle field of view, the narrow-angle directional region of the narrow-angle camera being farther from the vehicle than the wide-angle directional region of the wide-angle camera therefrom, the autonomous driving control apparatus comprising:

a drive control unit configured to:
    determine, based on the wide-angle and narrow-angle images and an autonomous driving condition, a value of at least one controlled variable for autonomous driving of the vehicle; and
    output, to the vehicle control unit, the value of the at least one controlled variable to thereby cause the vehicle control unit to carry out a task of autonomously driving the vehicle; and a camera monitor unit configured to:
    determine whether one of the wide-angle camera and narrow-angle camera has malfunctioned; and
    limit, when determining that the wide-angle camera has malfunctioned, the autonomous driving condition based on the wide-angle directional region corresponding to the wide-angle camera determined as having malfunctioned, the drive control unit being configured to determine the value of the at least one controlled variable in accordance with the limited autonomous driving condition to thereby cause the vehicle control unit to continuously carry out the task of autonomously driving the vehicle in accordance with the determined value of the at least one controlled variable, the camera monitor unit is configured to perform at least one of:
    a first task of prompting a driver of the vehicle to discontinue the task of autonomously driving the vehicle when determining that the narrow-angle camera has malfunctioned; and
    a second task of forcibly discontinuing the task of autonomously driving the vehicle when determining that the narrow-angle camera has malfunctioned.

2. The autonomous driving control apparatus according to claim 1, wherein:
    the vehicle further includes a telephoto camera whose telephoto directional region is farther from the vehicle than the narrow-angle directional region of the narrow-angle camera therefrom, the telephoto camera having a telephoto angular field of view that is narrower than the narrow-angle field of view;
    the autonomous driving condition includes a speed of the vehicle; and
    the camera monitor unit is configured to:

determine whether one of the telephoto camera, wide-angle camera, and narrow-angle camera has malfunctioned; and limit the speed of the vehicle when determining that the telephoto camera has malfunctioned.

3. The autonomous driving control apparatus according to claim 1, wherein:
the autonomous driving condition includes an execution condition of an autonomous steering of the vehicle; and
the camera monitor unit is configured to limit the execution condition of the autonomous steering of the vehicle when determining that the wide-angle camera has malfunctioned.

4. The autonomous driving control apparatus according to claim 1, wherein:
the vehicle further includes a telephoto camera whose telephoto directional region is farther from the vehicle than the narrow-angle directional region of the narrow-angle camera therefrom, the telephoto camera having a telephoto angular field of view that is narrower than the narrow-angle field of view; and
the camera monitor unit is further configured to:
determine whether one of the telephoto camera, the wide-angle camera, and the narrow-angle camera has malfunctioned.

5. The autonomous driving control apparatus according to claim 4, wherein: the telephoto camera, narrow-angle camera, and wide-angle camera are aligned with each other in a height direction of the vehicle.

6. The autonomous driving control apparatus according to claim 4, wherein:
the telephoto directional region, narrow-angle directional region, and wide-angle directional region are arranged to at least partly overlap with each other in a height direction of the vehicle.

7. A computer program product comprising a non-transitory computer-readable storage medium for a vehicle that includes:
at least a wide-angle camera and a narrow-angle camera configured to respectively capture at least a wide-angle image and a narrow-angle image of at least a wide-angle directional region and a narrow-angle directional region that are at least partly different from each other from the vehicle, the wide-angle camera having a predetermined wide-angle field of view, the narrow-angle camera having a predetermined narrow-angle field of view that is narrower than the wide-angle field of view, the narrow-angle directional region of the narrow-angle camera being farther from the vehicle than the wide-angle directional region of the wide-angle camera therefrom;

a vehicle control unit configured to control a travelling state of the vehicle; and a drive control unit configured to:
determine, based on the wide-angle and narrow-angle images and an autonomous driving condition, a value of at least one controlled variable for autonomous driving of the vehicle; and
output, to the vehicle control unit, the value of the at least one controlled variable to thereby cause the vehicle control unit to carry out a task of autonomously driving the vehicle, the computer program product comprising:
a set of computer program instructions stored in the non-transitory computer-readable storage medium of the computer program product, the instructions causing a computer to carry out:
a first step of determining whether one of the first and second cameras wide-angle camera and narrow-angle camera has malfunctioned;
a second step of limiting, when it being determined the wide-angle camera has malfunctioned, the autonomous driving condition based on the wide-angle directional region corresponding to the wide-angle camera determined as having malfunctioned; and
a third step of performing at least one of:
a first task of prompting a driver of the vehicle to discontinue the task of autonomously driving the vehicle when it is determined that the narrow-angle camera has malfunctioned; and
a second task of forcibly discontinuing the task of autonomously driving the vehicle when it is determined that the narrow-angle camera has malfunctioned.

* * * * *